No. 874,120. PATENTED DEC. 17, 1907.
C. E. SELF.
TRAP.
APPLICATION FILED APR. 22, 1907.

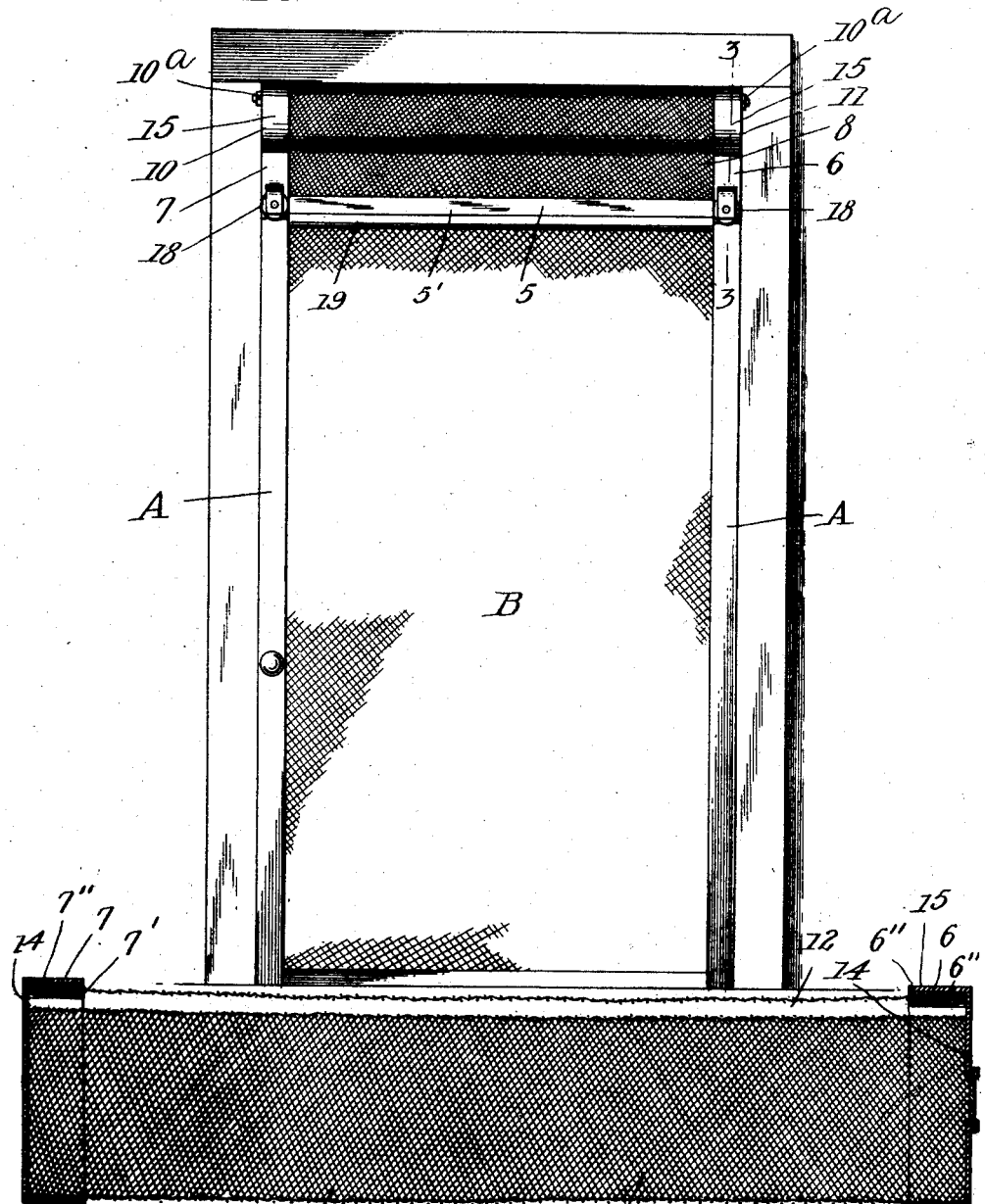

2 SHEETS—SHEET 2.

WITNESSES:

INVENTOR
Charles E. Self.
BY Woodward & Chandlee
Attorneys

UNITED STATES PATENT OFFICE.

CHARLES EDWARD SELF, OF RICHWOOD, OHIO.

TRAP.

No. 874,120.　　　Specification of Letters Patent.　　　Patented Dec. 17, 1907.

Application filed April 22, 1907. Serial No. 369,499.

*To all whom it may concern:*

Be it known that CHARLES EDWARD SELF, a citizen of the United States, residing at Richwood, in the county of Union and State of Ohio, has invented certain new and useful Improvements in Traps, of which the following is a specification.

This invention relates to traps and more particularly to insect traps, and has for its object to provide a trap which may be attached to screen doors, windows, etc. to catch flies and other insects from such screens. It will also be understood that the trap may be employed in connection with other windows.

Another object is to provide a trap which will be simple and thus cheap, and which will include novel features tending to produce a trap satisfactory and efficient in every way.

Figure 1:
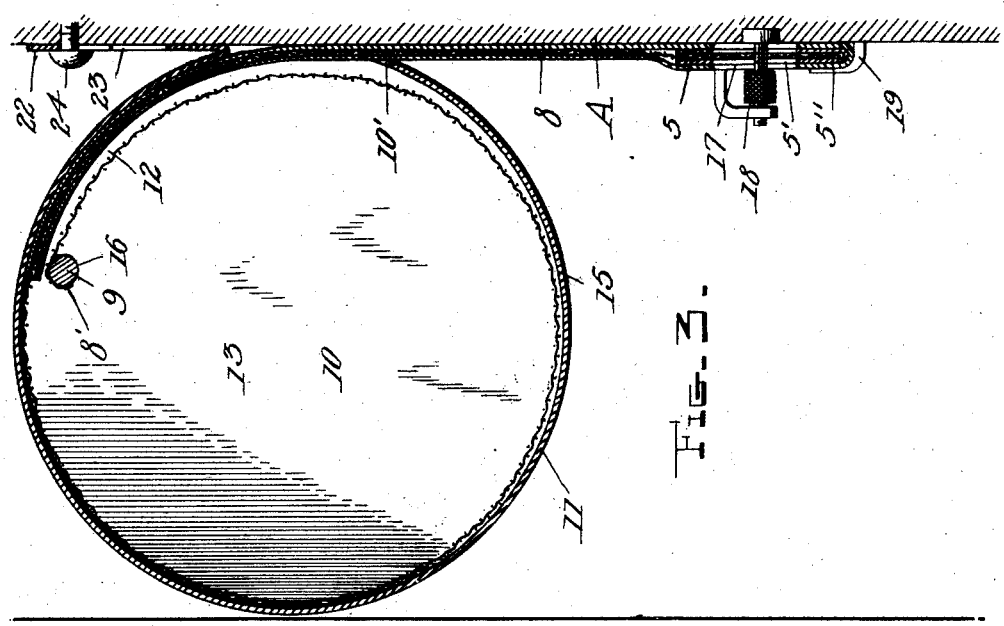
Figure 2:
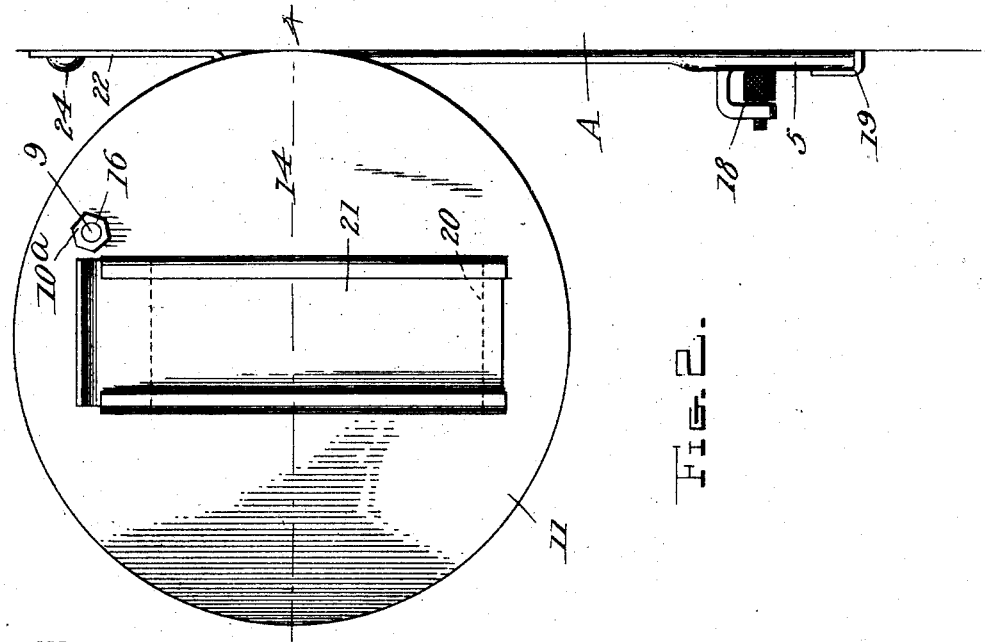

In the drawings forming a portion of this specification and in which like numerals of reference indicate similar parts in the several views: Figure 1 is a front elevation of the present trap attached to a door, Fig. 2 is an end view showing the door for the removal of insects, Fig. 3 is a vertical section through one end portion of the trap on line 3—3 of Fig. 1, Fig. 4 is a vertical section taken longitudinally of the trap on line 4—4 of Fig. 2.

Referring now to the drawings the present trap comprises a horizontal bottom member 5 formed of a piece of metal bent longitudinally upon itself to form portions 5' and 5", having their free edges directed upwardly. The member 5 has end members 6 and 7 secured thereto and extending vertically, as shown, these members being formed similarly to the bottom member 5 and including front and rear portions 6' and 6", and 7' and 7", respectively, the bottom member 5 having its ends engaged between the front and rear portions of the end members as shown. The end members have their free edge portions directed inwardly, and at their upper portions these end members are curved forwardly, as shown.

A piece of wire screen or other foraminous material 8 has its lower edge portion engaged in the bottom member 5, between the front and rear portions thereof, and has its side edge portions similarly engaged in the end members 6 and 7. Beyond the forwardly curved upper end portions of the end members the material 8 is curved downwardly, then inwardly, and then upwardly in scroll form, in continuation of the curvature of the end members, and this material 8 has its upper edge 8' secured to a horizontally extending rod 9 having its ends engaged in caps 10 and 11, to be presently described. This rod 9 holds the edge portion 8' of the material in spaced relation to the adjacent rearward portion thereof, and there is thus formed a passage 12 communicating with the chamber 13 which is formed by the curving of the material 8, as described above. The lower portion of the material acts as a guideway to the passage, as will be observed.

The caps 10 and 11 are each formed of a disk 14 having a peripheral flange 15 which receives therewithin an end portion of the curved part of the material 8, and the upper portion of the adjacent end member, the flanges 15 having cut away portions 10' therein, which receive the end members as shown. The disks 14 are provided with openings 16 in their upper portions which receive the ends of the rod 9, fastening devices $10^a$ being engaged with the ends of the rod, to hold the latter in position.

Formed in the end members 6 and 7 at the lower portion thereof, and through the ends of the bottom member 5, there are passages 17 for the reception therethrough of turn buckles 18 secured to that to which the trap is attached. In the drawings, these turn buckles are carried by the side members A of a screen door B and the bottom member 5 is provided with a detachable flange 19, which extends inwardly against the fabric of the door to prevent the passage of flies between this fabric and the bottom member 5.

The cap 10 is provided with an opening 20 in its disk 14, which is equipped with a sliding closure 21, and through this opening flies may be removed from the chamber.

Each cap has secured to the rearward portion of its flange 15, an upwardly extending tab 22 having a key hole slot 23 therein, these slots being arranged for the reception of buttons 24 carried in the present instance, by the side members A of the door.

What is claimed is:

1. A trap comprising a bottom member, vertical end members secured to the bottom member, said end members having their upper portions curved forwardly, foraminous material secured to the bottom and side members and having its upper portion rolled upon itself to form a chamber and a passage leading from its lower portion into said chamber, caps engaged with the ends of said rolled portion and with the upper portions of the end members, said caps having notches in which the end members are engaged, and a rod engaged in the caps and secured to the edge portion of the material within the chamber.

2. In a trap, the combination with connected bottom and end members, each including a plate bent upon itself to form two portions, of a piece of screen engaged at its edges between said portion, said end members having their upper end portions curved forwardly, said screen extending beyond said curved portions of the end members and being rolled upon itself to form a chamber and a passage leading from its lower portion into said chamber, and caps engaged with the ends of said rolled portion.

In testimony whereof he affixes his signature, in presence of two witnesses.

CHARLES EDWARD SELF.

Witnesses:
J. L. HORN,
W. S. BURGOON.